Oct. 28, 1924.
L. G. BYNUM ET AL
1,513,488
MILK STRAINER
Filed May 12, 1922
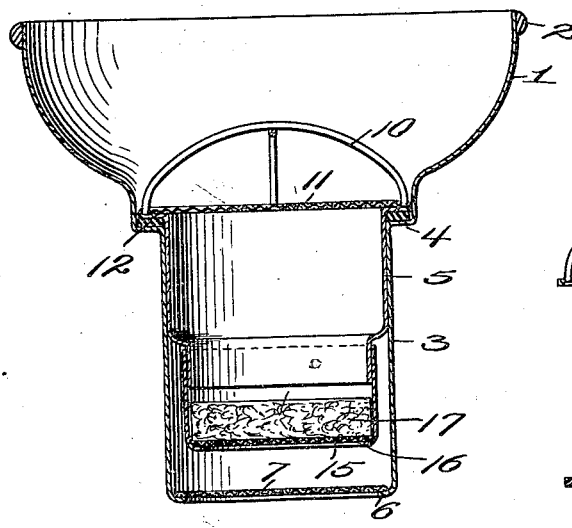
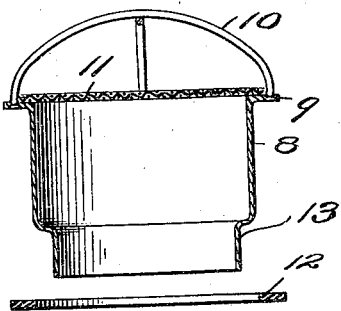
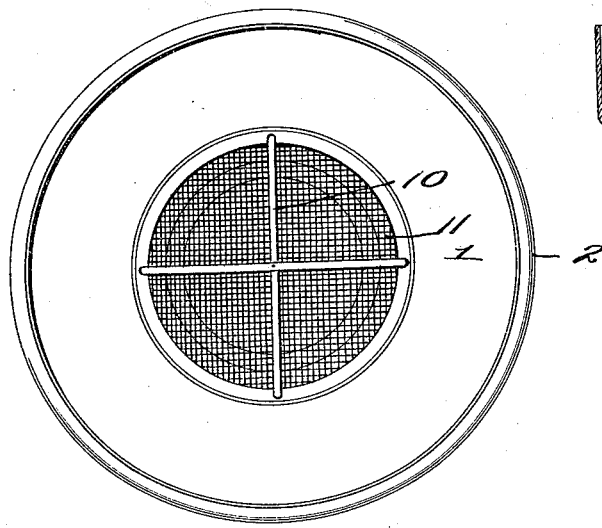
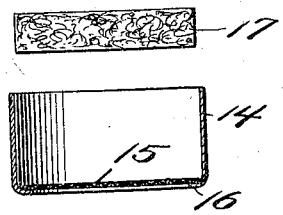
Inventors
Louis G. Bynum
John W. Ball
By  Attorney Patented Oct. 28, 1924.

1,513,488

UNITED STATES PATENT OFFICE.

LOUIS G. BYNUM AND JOHN W. BALL, OF FORSYTH, MONTANA.

MILK STRAINER.

Application filed May 12, 1922. Serial No. 560,306.

*To all whom it may concern:*

Be it known that we, LOUIS G. BYNUM and JOHN W. BALL, citizens of the United States, residing at Forsyth, in the county of Rosebud and State of Montana, have invented new and useful Improvements in Milk Strainers, of which the following is a specification.

This invention relates to milk strainers and proposes the construction of an article of the class described so constituted as to efficiently perform the function of clarification, and which at the same time may be conveniently disassembled for purposes of cleansing and sterilization.

One of the principal objects of the invention is the provision in a milk strainer of a system of permanent straining elements, and a renewable fibrous filtering member so arranged with respect to one of said straining elements as to be protected from the grosser particles of foreign substance in the liquid passing through said strainer.

Another object of the invention is the provision of a straining funnel, and a removable receptacle fitting therein for carrying a renewable fibrous filtering member, and a lower cap for said receptacle for retaining said filtering member in place, said parts being entirely removable and separable one from the other to facilitate sanitary cleansing.

With the above and other objects in view, our invention consists in the improved milk strainer illustrated in the accompanying drawings, described in the following specification, and particularly claimed, and in such variations and modifications thereof as will be obvious to those skilled in the art to which our invention relates.

In the drawings accompanying and forming a part of this specification, and wherein the preferred embodiment of our invention is illustrated:—

Figure 1 is a sectional elevation of our improved strainer.

Figure 2 is a plan view of the same.

Figure 3 is a view in sectional elevation of the removable inner receptacle showing the fibrous filtering member.

Referring now in detail to the several figures the numeral 1 represents the funnel shaped reservoir or upper portion of the strainer, which may be made of any capacity but in the present embodiment is of such size as to hold several gallons of liquid. The upper peripheral edge of the funnel shaped portion is reinforced by having the ring 2 soldered or otherwise secured thereto. Said upper edge may be formed with an integrally rolled rim, if desired in place of the ring 2, but the latter is generally to be preferred on account of the absence of any crevice where the rim abuts against the outside surface of the funnel shaped portion and which would be difficult to keep in sanitary condition. The lower part 3 of the strainer is tubular in form and of suitable size to enter into the mouth of a shipping milk can. The intermediate portion of the strainer between the funnel shaped portion 1 and the tubular portion 3 is horizontally flanged as at 4 forming a flat shoulder for the support of the inner receptacle 5. The lower end of the tubular portion 3 is inwardly flanged as at 6, the flanged portion having soldered thereto a fine mesh straining element 7.

The inner receptacle comprises a cylindrical portion 8, shown in Figure 3 and having its upper end outwardly flanged as at 9 and provided with a handle 10 which is conveniently formed of two wires arranged at right angles to one another and having their outer ends riveted or otherwise secured to the flange 9. A fine mesh strainer 11 is soldered across the upper end of the receptacle 5. Said receptacle is designed to fit into the strainer with the lower face of the flange 9 seating upon the shoulder 4, and the cylindrical portion 8 making a close fit with the tubular portion 3 of the strainer. In order to prevent liquid from the funnel shaped member 1 leaking between the flange 9 and the shoulder 4 and between the walls of the parts 3 and 8 a rubber gasket 12 is interposed between the flange 9 and the shoulder 4. This gasket is not essential and the surfaces of said flange and said shoulder may ordinarily be relied upon to prevent any material leakage thereby of unstrained milk.

The lower end 13 of the inner receptacle 5 is slightly reduced in diameter and a cap 14 is provided which frictionally fits telescopically over said reduced portion. A wide mesh strainer 15 is soldered to an inturned flange 16 formed at the bottom of said cap.

The cap 14 is designed to receive a sanitary cotton filtering member 17, the latter being cylindrical in form as shown in Figure 2 and being of any desired thickness.

This filtering member is made of layers of absorbent cotton retained between disks of cheese cloth or other open mesh fabric for convenience in handling, and is renewable.

The strainer is operated as follows: A cotton filtering element having been placed in the cap 14 the latter is telescoped upon the reduced portion 13 of the inner receptacle and the latter is then positioned within the strainer. The funnel shaped reservoir 1 is then filled with milk which finds its ways through the strainer element 11 by which the grosser foreign particles are retained, the milk then filtering through the cotton filtering member and finally passing through the fine mesh strainer 7, being thus thoroughly clarified. One of the main objects of the straining element 11 is to protect the upper surface of the filtering member from becoming clogged with the larger particles of sediment or floating bodies in the milk and also to prevent the air bubbles from coming into contact with said filtering member thus assuring to the latter a perfect liquid contact and a high degree of filtering efficiency. When the filtering operation has been completed the inner receptacle is withdrawn from the strainer by means of the handle 10, the cap removed, the filtering member discarded and the parts thoroughly washed and sterilized.

Obviously, changes in the details of construction may be made, without departing from the spirit of the invention and we do not wish to limit ourselves to any particular form of arrangement of parts.

Having described our invention what we claim as new and desire to secure by Letters Patent, is:—

1. A liquid strainer comprising a reservoir, having a tubular portion provided with a straining element covering its lower end, a receptacle fitting within said reservoir and removably separable therefrom, said receptacle being open at both ends and of reduced diameter at its lower end, a straining element covering the upper end of said receptacle, a fibrous filtering member carried by said receptacle below said straining element, a perforated cap for the lower end of said receptacle, a handle for said receptacle consisting of two wires connected to the upper end of the receptacle and arranged in planes at right angles to each other.

2. A liquid strainer comprising a funnel shaped reservoir having a tubular lower portion with a flat annular shoulder therebetween, a straining element covering the lower end of said tubular portion, a receptacle fitting within the tubular portion of said reservoir and having a peripheral flange at its upper end adapted to seat upon said annular shoulder, said receptacle being open at both ends, a straining element covering the upper end of said receptacle, the lower end of said receptacle being reduced in diameter, a cap having a perforated bottom telescopically fitting the reduced lower end of said receptacle and a fibrous filtering material contained within and substantially filling the space within said cap between the lower end of the receptacle and the perforated bottom of said cap.

In testimony whereof we have hereunto set our hands in presence of two subscribing witnesses.

LOUIS G. BYNUM.
JOHN W. BALL.

Witnesses:
FERMEN F. ZIMMERMAN,
IMOND R. BALL.